United States Patent [19]
Yamazaki et al.

[11] Patent Number: 4,581,431
[45] Date of Patent: Apr. 8, 1986

[54] PROCESS FOR PURIFYING RUBBERY POLYMERS

[75] Inventors: Yoshihide Yamazaki; Kazumi Uchimura; Satoshi Yamashita; Mikio Takeuchi, all of Yokkaichi, Japan

[73] Assignee: Japan Synthetic Rubber Co., Ltd., Tokyo, Japan

[21] Appl. No.: 651,775

[22] Filed: Sep. 18, 1984

[51] Int. Cl.$^4$ .................................................. C08F 6/08
[52] U.S. Cl. ..................................... 528/494; 528/499
[58] Field of Search ................................ 528/499, 494

[56] References Cited

U.S. PATENT DOCUMENTS 3,740,381  6/1973  Di Drusco et al. ............... 260/80.78

FOREIGN PATENT DOCUMENTS 50-091683  7/1975  Japan .................................... 528/494
158206     9/1982  Japan .

Primary Examiner—Paul R. Michl
Attorney, Agent, or Firm—Oblon, Fisher, Spivak, McClelland & Maier

[57] ABSTRACT

A process for purifying a rubbery polymer by removing a catalyst residue from a rubbery polymer containing the catalyst residue obtained by polymerizing in slurry ethylene and an α-olefin or ethylene, an α-olefin and a non-conjugated diene in a poor solvent with a catalyst consisting of an organoaluminum compound and a transition metal compound, characterized in that the removal of the catalyst residue is conducted by water extraction consisting of (1) adding a good solvent and a surface active agent to the polymer slurry in the first step, and
(2) adding water to the slurry obtained in above (1) in second step.

This process enables the catalyst residue to be removed from EPDM in a very high efficiency.

12 Claims, No Drawings

PROCESS FOR PURIFYING RUBBERY POLYMERS

BACKGROUND OF THE INVENTION

1. Field of the Invention

This invention relates to a process for preparing a purified rubbery polymer, more particularly to a process for removing in a high efficiency the catalyst residue contained in a rubbery polymer of ethylene and an α-olefin or of ethylene, an α-olefin and a non-conjugated diene (hereinafter referred to as EPDM) which has been obtained by a slurry polymerization method using a so-called Ziegler type catalyst.

2. Description of the Prior Art

The industrial process for the production of EPDM includes a solution polymerization method and a slurry polymerization method. The latter method is more advantageous in the following respects: (1) the viscosity of the reaction medium is low, and mass transfer and mixing are easy, and therefore, (2) it is possible to make the concentration of a polymer per unit amount of a solvent high. However, it also has following serious problems:

Since the polymer is deposited in the state that the catalyst is kept therein, it is difficult to remove the catalyst, and when the catalyst remains therein in a large amount, the remaining catalyst causes (a) coloring or aging of the polymer and (b) corrosion of metallic materials which are contacted with the polymer during the production process and the processing process.

Therefore, it has been desired to reduce the amount of the catalyst residue as much as possible in the slurry polymerization step.

SUMMARY OF THE INVENTION

Under the circumstances described above, the present inventors have conducted extensive research for the purpose of removing a catalyst residue from the EPDM obtained by a slurry polymerization method. As a result, they have found a removing method having a very high efficiency.

According to this invention, there is provided a process for purifying a rubbery polymer by removing a catalyst residue from a rubbery polymer containing the catalyst residue obtained by polymerizing in slurry ethylene and an α-olefin or ethylene, an α-olefin and a non-conjugated diene in a poor solvent with a catalyst consisting of an organoaluminum compound and a transition metal compound, characterized in that the removal of the catalyst residue is conducted by water extraction consisting of (1) adding a good solvent and a surface active agent in very small amounts to the resulting polymer slurry in the first step whereby the surface active agent is sufficiently permeated into the polymer particles while swelling the polymer particles, and (2) adding water to the slurry obtained in above (1) in the second step, followed by stirring the resulting mixture to permeate water into the polymer particles.

DETAILED DESCRIPTION OF THE INVENTION

As the organoaluminum compounds used for the preparation of EPDM, there are known such compounds as triethylaluminum, triisobutylaluminum, diethylaluminum chloride, diisobutylaluminum chloride, ethylaluminum sesquichloride and the like.

Also as the transition metal compounds, there are generally used vanadium oxytrichloride, vanadium tetrachloride and those modified with an alcohol having 1–12 carbon atoms; and vanadium compounds such as vanadium triacetylacetonate, oxyvanadium diacetylacetonate and the like. Moreover, there may be also used titanium compounds such as titanium tetrachloride, titanium trichloride and those supported on a carrier such as silica, alumina, magnesium chloride and the like.

As the method of preparing the carrier-supported titanium compounds, there may be preferably adopted the methods described in Japanese Patent Application Kokai (Laid-Open) Nos. 183,711/83, 198,507/83, 183,713/81 and 210,913/83.

As the α-olefins for EPDM, there may be used propylene, 1-butene, 1-hexene, 4-methyl-1-pentene, 1-octene and the like, among which propylene, which can be used also as a slurry medium as stated hereinafter, is particularly preferred.

As the non-conjugated diene, there may be used straight chain or cyclic dienes or polyenes, specifically, for example, 5-methylene-2-norbornene, 5-ethylidene-2-norbornene (ENB), 5-propylidene-2-norbornene, dicyclopentadiene (DCP), 1,4-hexadiene, 5-isopropenyl-2-norbornene and the like, among which ENB and DCP are preferred.

The slurry medium which may be used in this invention is preferably the one in which substantially no EPDM is dissolved, and includes specifically, for example, propylene, 1-butene, methylene dichloride, methylene dibromide, ethyl chloride and mixtures thereof. Among these, it is particularly preferred to use propylene which is also a reacting monomer.

Next, the process for removing a catalyst according to this invention is explained.

To a slurry obtained by a polymerization reaction using said catalyst, monomer and solvent is added a good solvent in a very small amount for swelling polymer particles in the first step. As the good solvent, there may be used aliphatic and aromatic hydrocarbon solvents such as n-hexane, n-octane, n-nonane, cyclohexane, toluene, methylcylopentane, benzene, xylene, ethylbenzene and the like.

The amount of these good solvents added are such an extent as to swell the polymer particles.

In order to swell EPDM, the good solvent is added to the slurry so that the solubility parameter (hereinafter referred to as S.P. value) of the slurry medium becomes 6.15–6.50. For instance, if the added good solvent is cyclohexane, 0.075 part by volume of cyclohexane per part by volume of propylene is added, whereby the S.P. value becomes 6.25 and the EPDM particles can be swollen.

Further, the S.P. value used herein refer to the value at 25° C., and the S.P. values of representative solvents are as follows:

| propylene | 6.10, | 1-butene | 6.70, |
|---|---|---|---|
| n-hexane | 7.24, | n-octane | 7.55, |
| n-nonane | 7.65, | cyclohexane | 8.18, |
| toluene | 8.91, | benzene | 9.15, |
| ethylbenzene | 8.80 | | |

Also, the S.P. values of liquid mixtures are represented as the arithmetic means of the S.P. values of the respective components based on their volume fractions.

The good solvents are preferably those which can swell polymers when they are added in a small amount and which have relatively low boiling points in view of the recovery in a subsequent step. Among the good solvents described above, cyclohexane and toluene can be used particularly preferably.

Also, the above-mentioned good solvent may be added in the predetermined amount to the slurry after the polymerization, or added to the reaction medium during the polymerization.

In the first step, a surface active agent is added in addition to the good solvent. The surface active agent added contacts with the swollen polymer particles and permeates thereinto to facilitate the diffusion of water added in the second step.

The surface active agents are preferably non-ionic surface active agents of the polyoxyethylene alkyl phenyl ether type, the polyoxyethylene alkyl ether type and, the polyoxyethylene sorbitan ester type, and in particular, non-ionic surface active agents which are dissolved in said good solvents are preferred. However, cationic, anionic or amphoteric surface active agents may be used along therewith.

These surface active agents may be added together with said good solvents or added after the good solvents have been added.

When the good solvent is added to the polymerization medium, the surface active agent must be added to the slurry after the polymerization apart from the good solvents. This is because said surface active agent becomes a catalyst poison, which will deprive the catalyst of its polymerization activity.

The amount of the surface active agent added is preferably 0.005–1.0% by weight, more preferably 0.01–0.5% by weight, based on the weight of water which is added in the subsequent step. The interval from the addition of the surface active agent to the addition of water is preferably 0.1–120 minutes, more preferably 1–60 minutes.

In the second step, water is added to the slurry in which the surface active agent has been sufficiently permeated into the polymer particles, and the resulting mixture is stirred.

The amount of water added is preferably 0.1–2.0 parts, more preferably 0.3–1.0 parts, by volume per part by volume of the slurry obtained in the polymerization step.

The longer the stirring time after the addition of water, the better the catalyst removing effect is obtained. However, a stirring time of 5–60 minutes is usually sufficient. The temperature for the water extraction of the catalyst is preferably 5°–100° C., more preferably 10°–50° C.

As explained above, this invention is characterized in that:
(1) polymer particles which have been swollen with a good solvent are contacted with a surface active agent, and
(2) water is subsequently added thereto to extract the catalysts with the water.

According to this characteristic procedure, the following effects are obtained:
(a) Polymer particles are swollen, and the good solvent is held in the polymer particles, so that the surface active agent is easily diffused and permeated into the polymer particles.
(b) When the surface active agent has previously been permeated into the polymer particles, water which is subsequently added diffuses easily into the polymer particles and the extraction of catalysts with water is accelerated.

If the surface active agent is previously dissolved in water and the resulting solution is then added to the polymer particles, no good catalyst-removing effect is obtained as shown in the Examples appearing hereinafter. This is probably because a boundary film due to water is formed and this resists against diffusion, whereby the surface active agent and water do not sufficiently permeate into the polymer particles.

(c) According to this invention, the good solvent works only for swelling the polymer particles, so that it is possible to reduce the amount of the good solvent used to about 1/10–1/20 of that in the method of adding the good solvent in a relatively large amount after the surface active agent and water have been added to the polymer slurry.

Further, the present inventors have also found that if a polymerization terminating agent is added to the slurry before the addition of or along with the surface active agent, a higher catalyst-removing effect can be obtained. This method is also included in the scope of this invention.

The polymerization terminating agents which can preferably be used are the alkyl ester derivatives of polyethylene glycol, which has a structure having a group represented by the formula:

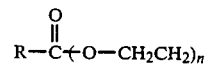

wherein R represents an alkyl group having 1–20 carbon atoms, and n is an integer of 3–200. Said derivatives include, for example, polyoxyethylene monoalkylate, tetraoleic acid polyoxyethylene sorbit, polyoxyethylene sorbitan trialkylate, polyoxyethylene dialkylate and the like, among which tetraoleic acid polyoxyethylene sorbit is particularly preferred.

The amounts of these compounds added are 0.5–10 parts by weight, preferably 1–5 parts by weight, per part by weight of a transition metal compound which is a polymerization catalyst.

Also, if a mill is suitably arranged to pulverize the polymer particles into fine powder, the higher catalyst-removing effect can be obtained as will be shown in the Example appearing hereinafter. The time when the polymer particles are pulverized is not critical, and the pulverization may be carried out prior to the addition of the surface active agent or the polymerization terminating agent or after the addition of water.

Although this invention is specifically explained below referring to Examples, it should be interpreted that this invention is not limited to the Examples. For instance, though polymerization reaction and catalyst-removal are carried out batchwise in the Examples, the process of this invention can be applied also to a continuous operation, so that a continuous catalyst-removing method according to this invention is also within the scope of this invention.

Further, in the Examples, the amount of catalyst residue was measured by atomic absorption spectrometry.

EXAMPLE 1

To an EPDM slurry in propylene having a polymer concentration of 29% by weight, which had been obtained by copolymerizing ethylene, propylene and ENB in liquid propylene using diethylaluminum chloride and vanadium oxytrichloride as a polymerization catalyst, was added cyclohexane in an amount of 0.075 part by volume per 1.0 part by volume of liquid propylene (S.P. value: 6.25), whereafter 3.2 g of a surface active agent polyoxyethylene nonyl phenyl ether [trade name: Noigen EA-120 (Daiichi Kogyo Seiyaku)] was added to 10 liters of the resulting slurry, and the stirring of the mixture was continued for 15 minutes.

Then, 8 liters of water was added to the slurry thus obtained so that the concentration thereof became 0.80 part by volume per 1.0 part by volume of the slurry, and the stirring was continued at 30° C. for 30 minutes. The stirring was thereafter stopped, and the mixture was allowed to stand for about 1 hour to separate it into an EPDM slurry and water.

The EPDM slurry thus separated from water was subjected to the well-known steam stripping to remove unreacted monomers and a small amount of the good solvent, and the EPDM thus obtained was dried. The analytical results of the EPDM obtained are shown in Table 1 together with those in the other Examples.

Further, EPDM prior to removing catalysts was also collected and analyzed at the same time.

EXAMPLE 2

To an EPDM slurry in propylene having a polymer concentration of 33% by weight obtained by carrying out the polymerization reaction under the same conditions is in Example 1 was added toluene in a proportion of 0.050 part by volume per 1.0 part by volume of liquid propylene (S.P. value: 6.24), whereafter 3.6 g of a surface active agent polyoxyethylene nonyl phenyl ether (trade name: Noigen EA-120) was added to 10 liters of the resulting slurry, and the stirring of the mixture was continued for 5 minutes. Then, 6 liters of water was added to the slurry thus obtained so that the concentration thereof became 0.60 part by volume per 1.0 part by volume of the slurry, and the stirring was continued at 20° C. for 20 minutes. The stirring was then stopped, and the mixture was allowed to stand for about 1 hour, whereafter the dried EPDM was collected and analyzed in the same manner as in Example 1.

EXAMPLE 3

EPDM was prepared by slurry polymerization using the same catalyst, monomer and solvent as in Example 1, except that unlike Example 1, 0.070 part by volume of cyclohexane had previously been added to 1.0 part by volume of liquid propylene (S.P. value; 6.24), and polymerization reaction was thereafter carried out.

The concentration of EPDM in the EPDM slurry thus obtained was 35% by weight. After completion of the polymerzation reaction, 4.0 g of a surface active agent polyoxyethylene nonyl phenyl ether (trade name: Noigen EA-80) was added to 10 liters of the EPDM slurry, and the stirring of the mixture was continued for 3 minutes. Then, 5.0 liters of water was added to the slurry thus obtained so that the concentration thereof became 0.50 parts by volume per 1.0 part by volume of the slurry, and stirring was continued at 40° C. for 20 minutes. The stirring was then stopped, and the mixture was, allowed to stand for about 1 hour, whereafter the dried EPDM was collected and analyzed in the same manner as in Example 1.

EXAMPLE 4

To an EPDM slurry having a polymer concentration of 30% by weight obtained by the polymerization reaction under the same conditions as in Example 1 was added cyclohexane in a proportion of 0.10 part by volume per 1.0 part by volume of liquid propylene (S.P. value: 6.29) and at the same time 4.8 g of a surface active agent (trade name: Noigen EA-80) was added to 10 liters of the resulting slurry, after which the stirring of the mixture was continued for 10 minutes.

Then, 8.0 liters of water was added to the slurry thus obtained so that the concentration thereof became 0.80 part by volume per 1.0 part by volume of the slurry, and the stirring was continued at 30° C. for 30 minutes. Thereafter, the dried EPDM was collected and analyzed in the same manner as in Example 1.

EXAMPLE 5

EPDM was prepared by slurry polymerization under the same conditions as in Example 3, to obtain an EPDM slurry having a polymer concentration of 28% by weight, to which tetraoleic acid polyoxyethylene sorbit (trade name: Leodol 440) was thereafter added as a polymerization terminating agent in a proportion of 3.0 parts by weight per 1.0 part by weight of vanadium oxytrichloride used in the copolymerization reaction, and the resulting mixture was stirred for 5 minutes.

Then, to 10 liters of the slurry obtained was added 2.0 g of a surface active agent polyoxyethylene nonyl phenyl ether (trade name: Noigen EA-120), and the stirring of the mixture was carried out for 5 minutes.

Thereafter, 4.0 liters of water was added to the slurry thus obtained so that the concentration thereof became 0.40 part by volume per 1.0 part by volume of the slurry, and stirring was continued at 30° C. for 20 minutes.

Then, the dried EPDM was collected and analyzed in the same manner as in Example 1.

EXAMPLE 6

EPDM was prepared by slurry polymerization under the same conditions as in Example 3, to obtain an EPDM slurry having a polymer concentration of 33% by weight.

To 10 liters of the EPDM slurry was added 2.4 g of a surface active agent polyoxyethylene nonyl phenyl ether (trade name: Noigen EA-120), and the mixture was stirred for 10 minutes, whereafter 4.0 liters of water was added to the slurry thus obtained so that the concentration thereof became 0.40 part by volume per 1.0 part by volume of the slurry, and the mixture was stirred at 20° C. for 10 minutes.

Then, the slurry was passed through a line-mixer into which mill teeth for pulverization of polymer particles had been incorporated, and thereafter, the mixture was allowed to stand to separate EPDM therefrom in the same manner as in Example 1, after which the slurry was subjected to steam stripping and drying to collect the dried EPDM, which was then subjected to analysis.

COMPARATIVE EXAMPLE 1

EPDM was prepared by slurry polymerization under the same conditions as in Example 1, to obtain an EPDM slurry having a polymer concentration of 30% by weight.

To 10 liters of the EPDM slurry was added 3.2 g of a surface active agent polyoxyethylene nonyl phenyl ether (trade name: Noigen EA-120) without addition of a good solvent, and the mixture was stirred for 15 minutes.

Then, 8.0 liters of water was added to the slurry thus obtained so that the concentration thereof became 0.8 part by volume per 1.0 part by volume of said slurry, and the stirring of the mixture was continued at 30° C. for 30 minutes. Thereafter, the dried EPDM was collected and analyzed in the same manner as in Example 1.

COMPARATIVE EXAMPLE 2

EPDM was prepared by slurry polymerization under the same conditions as in Example 1, to obtain an EPDM slurry having a polymer concentration of 33% by weight.

To the EPDM slurry was added cyclohexane in a proportion of 0.075 part by volume per 1.0 part by volume of liquid propylene, and the stirring of the mixture was carried out for 15 minutes.

Then, to 10 liters of the resulting slurry was added 8 liters of water having dissolved therein 3.2 g of a surface active agent polyoxyethylene nonyl phenyl ether (trade name: Noigen EA-120), and the mixture was stirred at 30° C. for 30 minutes.

Then, the dried EPDM was collected and analyzed in the same manner as in Example 1.

The amount of water added was 0.8 part by volume per 1.0 part by volume of the slurry.

COMPARATIVE EXAMPLE 3

EPDM was prepared by slurry polymerization under the same conditions as in Example 3, to obtain an EPDM slurry having a polymer concentration of 30% by weight.

To 10 liters of the EPDM slurry was added 5 liters of water having dissolved therein 4.0 g of a surface active agent polyoxyethylene nonyl phenyl ether (trade name: Noigen EA-80), and the stirring of the mixture was carried out at 40° C. for 20 minutes.

Then, the dried EPDM was collected and analyzed in the same manner as in Example 1.

In this case, the amount of water added was 0.50 part by volume per 1.0 part by volume of the slurry.

COMPARATIVE EXAMPLE 4

The polymerization reaction and the addition of a polymer terminating agent were carried out in the same manner as in Example 5, to obtain an EPDM slurry having a polymer concentration of 31% by weight.

To 10 liters of the slurry was added 4 liters of water having dissolved therein 2.0 g of a surface active agent polyoxyethylene nonyl phenyl ether (trade name: Noigen EA-120), and the mixture was stirred at 30° C. for 20 minutes.

Then, the dried EPDM was collected and analyzed in the same manner as in Example 1.

In this case, the amount of water added was 0.40 part by volume per 1.0 part by volume of the slurry.

COMPARATIVE EXAMPLE 5

EPDM was prepared by slurry polymerization under the same conditions as in Example 1, to obtain an EPDM slurry having a polymer concentration of 33% by weight.

To the slurry was added an emulsion mixture consisting of water, a surface active agent cyclohexane which has been previously prepared, and the mixture was stirred at 30° C. for 120 minutes.

Then, the dried EPDM was collected and analyzed in the same manner as in Example 1.

Said emulsion mixture had been prepared by vigorously stirring 8 liters of water, 3.2 g of polyoxyethylene nonyl phenyl ether (trade name: Noigen EA-120) and 650 ml of cyclohexane, and the whole amount thereof was added.

The amount of cyclohexane added was 0.075 part by volume per 1.0 part by volume of liquid propylene in the EPDM slurry in propylene.

TABLE 1
List of the Analytical Results

| | Composition of EPDM | | | | | Amount of catalyst residue | | | |
| | | | | | | Prior to removal of catalyst | | After removal of catalyst | |
| | $ML_{1+4}^{100°\ C.}$ | Content of propylene | Iodine number | Good solvent added | Surface active agent | Al ppm | V ppm | Al ppm | V ppm |
|---|---|---|---|---|---|---|---|---|---|
| Example 1 | 66 | 42 wt % | 22 | CHX | Polyoxyethylene nonyl phenyl ether (Noigen EA-120) | 1,900 | 285 | 36 | 28 |
| Example 2 | 70 | 44 | 25 | TL | Polyoxyethylene nonyl phenyl ether (Noigen EA-120) | 1,660 | 260 | 43 | 27 |
| Example 3 | 83 | 40 | 20 | CHX | Polyoxyethylene nonyl phenyl ether (Noigen EA-80) | 1,772 | 262 | 42 | 30 |
| Example 4 | 58 | 41 | 22 | CHX | Polyoxyethylene nonyl phenyl ether (Noigen EA-80) | 1,846 | 291 | 37 | 34 |
| Example 5 | 74 | 45 | 23 | CHX | Polyoxyethylene nonyl phenyl ether (Noigen EA-120) | 1,840 | 290 | 29 | 16 |
| Example 6 | 81 | 44 | 25 | CHX | Polyoxyethylene nonyl phenyl ether (Noigen EA-120) | 1,862 | 277 | 25 | 13 |
| Comparative Example 1 | 82 | 43 | 23 | none | Polyoxyethylene nonyl phenyl ether (Noigen EA-120) | 1,816 | 286 | 220 | 172 |
| Comparative | 71 | 44 | 23 | CHX | Polyoxyethylene | 1,733 | 275 | 209 | 133 |

TABLE 1-continued
List of the Analytical Results

| | Composition of EPDM | | | Good solvent added | Surface active agent | Amount of catalyst residue | | | |
|---|---|---|---|---|---|---|---|---|---|
| | | | | | | Prior to removal of catalyst | | After removal of catalyst | |
| | $ML_{1+4}^{100° C.}$ | Content of propylene | Iodine number | | | Al ppm | V ppm | Al ppm | V ppm |
| Example 2 | | | | | nonyl phenyl ether (Noigen EA-120) | | | | |
| Comparative Example 3 | 76 | 45 | 22 | CHX | Polyoxyethylene nonyl phenyl ether (Noigen EA-80) | 1,952 | 294 | 190 | 118 |
| Comparative Example 4 | 70 | 40 | 26 | CHX | Polyoxyethylene nonyl phenyl ether (Noigen EA-120) | 1,814 | 288 | 167 | 126 |
| Comparative Example 5 | 82 | 40 | 21 | CHX | Polyoxyethylene nonyl phenyl ether (Noigen EA-120) | 1,732 | 259 | 260 | 143 |

Note 1:
$ML_{1+4}^{100° C.}$ represents a Mooney viscosity and hydrogen was used for controlling the molecular weight.
2: Al ... aluminum, V ... vanadium.
3: Content of propylene was measured by infrared spectrograph.
4: Iodine number was measured by the iodine titration method.
5: CHX ... chclohexane, TL ... toluene.

We claim:

1. A process for purifying a rubbery polymer by removing a catalyst residue from a rubbery polymer insoluble in propylene and capable of being swollen by a good solvent for the polymer having a solubility parameter value of 7.24 to 9.15 containing the catalyst residue obtained by polymerizing in slurry ethylene and an α-olefin or ethylene, an α-olefin and a non-conjugated diene in a poor solvent for the polymer as the slurry medium, which poor solvent comprises propylene and is one that does not swell or dissolve the polymer, with a catalyst consisting of an organoaluminum compound and a transition metal compound, characterized in that the removal of the catalyst residue is conducted by a water extraction method whose first two steps consist of (1) having present in the slurry a good solvent for the polymer in amount sufficient to swell the polymer but less than the amount which will cause dissolution of the polymer, the good solvent being one that has a solubility parameter value of 7.24 to 9.15, that is miscible with the poor solvent and is able to swell the polymer and to dissolve the polymer, adding a nonionic surface active agent alone or together with a cationic, anionic or amphoteric surface active agent to the polymer slurry at a time not prior to termination of the polymerization and allowing the surface active agent to permeate the swollen polymer particles as the first step, and thereafter (2) adding water to the slurry obtained in (1) to obtain a water containing mixture and stirring the mixture as the second step.

2. A process according to claim 1, wherein the good solvent is added so that the solubility parameter of the slurry medium becomes 6.15-6.50, and the poor solvent is propylene.

3. A process according to claim 1, wherein the good solvent is cyclohexane, toluene or a mixture thereof.

4. A process according to claim 1, wherein the surface active agent is a nonionic surface active agent selected from the group consisting of polyoxyethylene alkyl phenyl ethers, polyoxyethylene alkyl ethers and polyoxyethylene sorbitan esters, and soluble in said good solvent.

5. A process according to claim 1, wherein the amount of the surface active agent added is 0.005-1.0% by weight based on the weight of water.

6. A process according to claim 1, wherein the amount of the surface active agent added is 0.01-0.5% by weight based on the weight of water.

7. A process according to claim 1, wherein the amount of water added is 0.1-2.0 parts by volume per part by volume of the slurry.

8. A process according to claim 1, wherein the amount of water added is 0.3-1.0 part by volume per part by volume of the slurry.

9. A process according to claim 1 where the solvent of the slurry medium is propylene.

10. A process according to claim 1 wherein the good solvent is added to the slurry medium after termination of the polymerization.

11. A process according to claim 1 wherein the good solvent is present in the slurry medium during the polymerization.

12. A process according to claim 2 wherein the poor solvent is propylene, the good solvent is cyclohexane or toluene and is added to the poor solvent after termination of polymerization, the amount of the surface active agent added is 0.005-1.0% by weight based on the weight of water and the amount of water added is 0.1-2.0 parts by volume per part by volume of the slurry.

* * * * *

UNITED STATES PATENT AND TRADEMARK OFFICE
CERTIFICATE OF CORRECTION

PATENT NO. : 4,581,431
DATED : April 8, 1986
INVENTOR(S) : Yoshihide Yamazaki et al It is certified that error appears in the above-identified patent and that said Letters Patent is hereby corrected as shown below:

Title page:

-- The Priority Information on the Letters Patent has been omitted. It should read as follows:

177142/83      JAPAN      September 27, 1983 --

Signed and Sealed this

First Day of July 1986

[SEAL]

Attest:

DONALD J. QUIGG

Attesting Officer

Commissioner of Patents and Trademarks